United States Patent
Nakano et al.

(10) Patent No.: US 9,667,828 B2
(45) Date of Patent: May 30, 2017

(54) PRINTING METHOD

(71) Applicant: Kabushiki Kaisha Toshiba, Minato-ku (JP)

(72) Inventors: Takahisa Nakano, Kawasaki (JP); Fumitoshi Morimoto, Shirakawa (JP); Shota Kure, Kawasaki (JP); Nobuki Nemoto, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/067,872

(22) Filed: Mar. 11, 2016

(65) Prior Publication Data

US 2016/0269588 A1    Sep. 15, 2016

(30) Foreign Application Priority Data

Mar. 13, 2015  (JP) .................................. 2015-051333
Sep. 7, 2015   (JP) .................................. 2015-176119

(51) Int. Cl.

| H04N 1/60 | (2006.01) |
| H04N 1/32 | (2006.01) |
| B41M 3/14 | (2006.01) |
| B41M 5/26 | (2006.01) |
| G06K 15/02 | (2006.01) |
| H04N 1/00 | (2006.01) |

(52) U.S. Cl.
CPC .......... *H04N 1/32219* (2013.01); *B41M 3/14* (2013.01); *B41M 5/26* (2013.01); *G06K 15/021* (2013.01); *H04N 1/0087* (2013.01); *H04N 1/6008* (2013.01); *H04N 1/6027* (2013.01); *B41M 5/267* (2013.01)

(58) Field of Classification Search
CPC ............. H04N 1/32219; H04N 1/0087; H04N 1/6008; H04N 1/6027
USPC ................................ 358/518, 1.15, 1.14, 504
See application file for complete search history.

(56) References Cited

U.S. PATENT DOCUMENTS

| 7,222,235 B1* | 5/2007 | Mitsui | ................... G06F 17/211 380/28 |
| 2002/0130456 A1* | 9/2002 | Hebert | ................... B25B 5/006 269/17 |
| 2008/0101699 A1* | 5/2008 | Onishi | ............... H04N 1/00838 382/181 |

\* cited by examiner

*Primary Examiner* — Houshang Safaipour
(74) *Attorney, Agent, or Firm* — Oblon, McClelland, Maier & Neustadt, L.L.P.

(57) ABSTRACT

A printing method detects a density of a first black image to be printed in a first black color; determines, when the detected density is equal to a first density, a size of a first character to be embedded in the first black image to a first size, and prints the first character at the first size in a second black color with a transmissivity at a near infrared ray band that is different from that of the first black color; determines, when the detected density is lower than the first density, a size of the first character to a second size larger than the first size, and prints the first character at the second size in the second black color; and prints a region except a region in which the first character is to be printed in the first black image, in the first black color.

15 Claims, 16 Drawing Sheets

| IMAGE DENSITY D | CHARACTER SIZE |
|---|---|
| $D \leq N1$ | S1 |
| $N1 < D < N3$ | S2 |
| $N3 \leq D$ | S3 |

FIG. 6

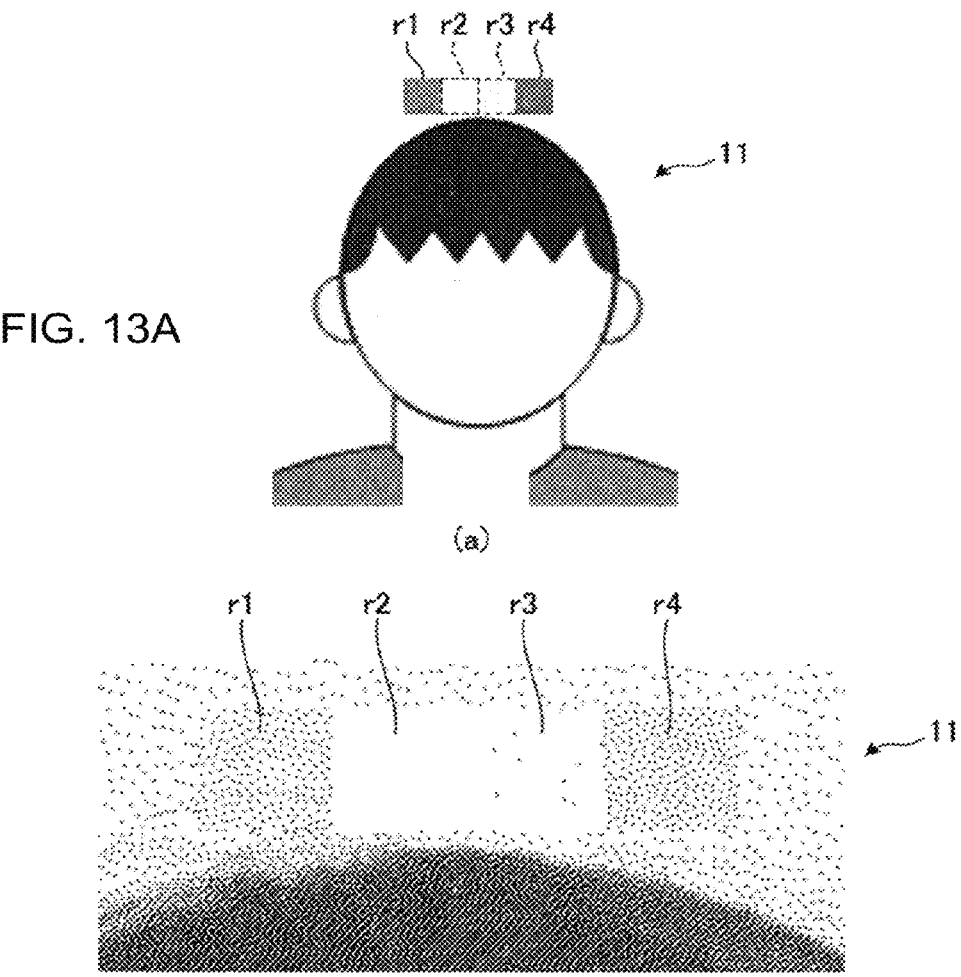

PRINTING METHOD

CROSS-REFERENCE TO RELATED APPLICATION(S)

This application is based upon and claims the benefit of priority from the prior Japanese Patent Application No. 2015-051333, filed on Mar. 13, 2015, and the benefit of priority from the prior Japanese Patent Application No. 2015-176119, filed on Sep. 7, 2015, the entire contents of which are incorporated herein by reference.

FIELD

Embodiments of the present invention relate to a printing method.

BACKGROUND

There is a technology to apply an outline micro character to a character portion printed with a black (K) ink, and a technology to print the micro character with a mixed color of cyan (C), magenta (M) and yellow (Y) inks. Since an outline micro character is small in a character size, it has characteristics that to print it by a general printer is difficult, and to visually recognize it is also difficult. In addition, a micro character printed with a mixed color of CMY inks has characteristics that to visually recognize it is further difficult.

However, a technology to apply a micro character is a technology which is limited to a character portion printed with a K ink, and it may be sometimes difficult to embed forgery preventing information, such as a micro character, in an image in which black portions thereof are indefinite, such as a face image.

BRIEF DESCRIPTION OF THE DRAWINGS

FIG. 6 is a diagram showing an example of a character size determination table to be used for determining a size of a forgery preventing character by the ID card manufacturing device according to the first embodiment.

FIG. 13A and FIG. 13B are diagrams for explaining an example of a print processing of a face image by an ID card manufacturing device according to a fourth embodiment.

FIG. 14 is a table showing an example of the relation between forgery preventing information to be embedded in a monochrome image in the ID card manufacturing device according to the fourth embodiment, and an embedding density indicating the forgery preventing information.

DETAILED DESCRIPTION

A printing method of the embodiment detects a density of a first black image to be printed in a first black color; determines, when the detected density is equal to a first density, a size of a first character to be embedded in the first black image to a first size, and prints the first character at the first size in a second black color with a transmissivity at a near infrared ray band that is different from that of the first black color; determines, when the detected density is lower than the first density, a size of the first character to a second size larger than the first size, and prints the first character at the second size in the second black color; and prints a region except a region in which the first character is to be printed in the first black image, in the first black color.

Another printing method of the embodiment prints a first region that is at least a part of a first black image, using a first black color with a transmissivity of a light at a near infrared band that is a first transmissivity, at a second density which is not more than a first density that is previously set to the first region and corresponds to forgery preventing information; and prints, when the second density is lower than the first density, the first region using a second black color with a transmissivity of a light at the near infrared band that is a second transmissivity different from the first transmissivity, so that a density of the first region becomes equal to the first density.

Hereinafter, ID card manufacturing devices to which a printing method according to the present embodiment is applied will be described, with reference to the attached drawings.

First Embodiment

Figure 1:
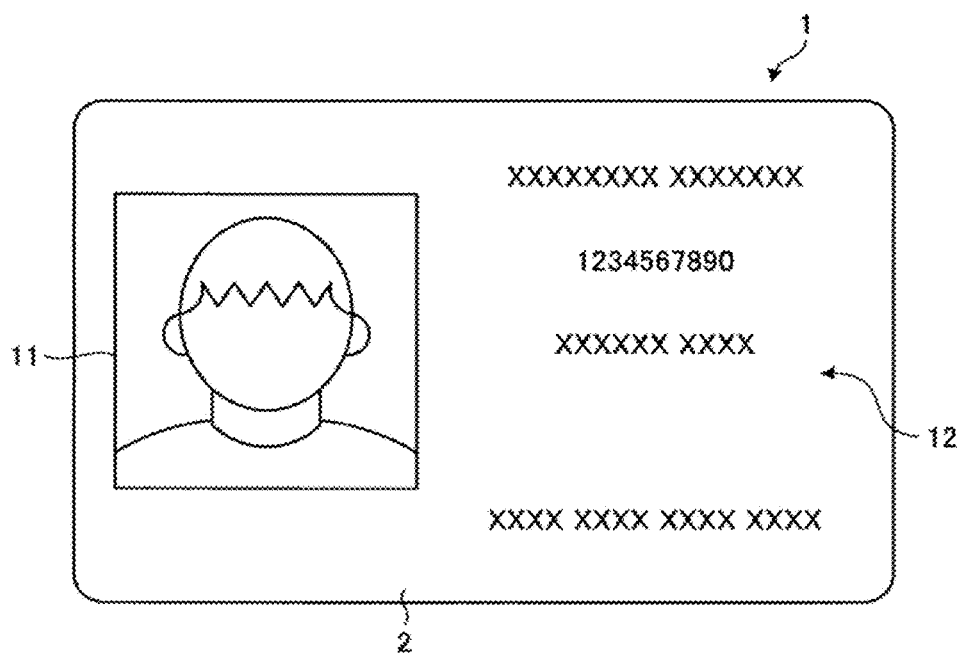
FIG. 1 is a diagram showing an example of an ID card manufactured by an ID card manufacturing device according to a first embodiment.

FIG. 1 is a diagram showing an example of an ID card manufactured by an ID card manufacturing device according to a first embodiment. In the present embodiment, an ID card 1 is a recording medium on which various types of information can be printed, and is a driver license, an admission card, or the like on which personal information has been printed, for example.

In the present embodiment, as shown in FIG. 1, in the ID card 1, personal information such as a face image 11 and character information 12 is printed on a substrate 2. The face image 11 is printed in color. In the present embodiment, material such as paper and polycarbonate is used, as the substrate 2 of the ID card 1. The material of the substrate 2 of the ID card 1 may be material on which an image, such as the personal information and so on can be printed, and is not limited to paper or polycarbonate. In addition, regarding an image to be printed on the ID card 1, the image may be directly printed on the substrate 2, or the image is printed on a transparent film F (not shown) for protecting the ID card 1, and the film F printed with the image may be pasted on the substrate 2.

In the present embodiment, an image is printed on the substrate 2 by a printing method which changes a density of an image to be printed by an area of dots per unit area (for example, a dither method which expresses shading of an image in two gradations). In addition, in the present embodiment, a color image is printed on the substrate 2 with respective inks of cyan (C), magenta (M) and yellow (Y). But since an image of a color (an example of a second black color) in which respective CMY inks are superposed, out of images to be printed on the substrate 2, is visually recognized as an image of a black color, an image of such a color is printed in a color (an example of a first black color) of a black (K) ink such as carbon black.

Figure 2:
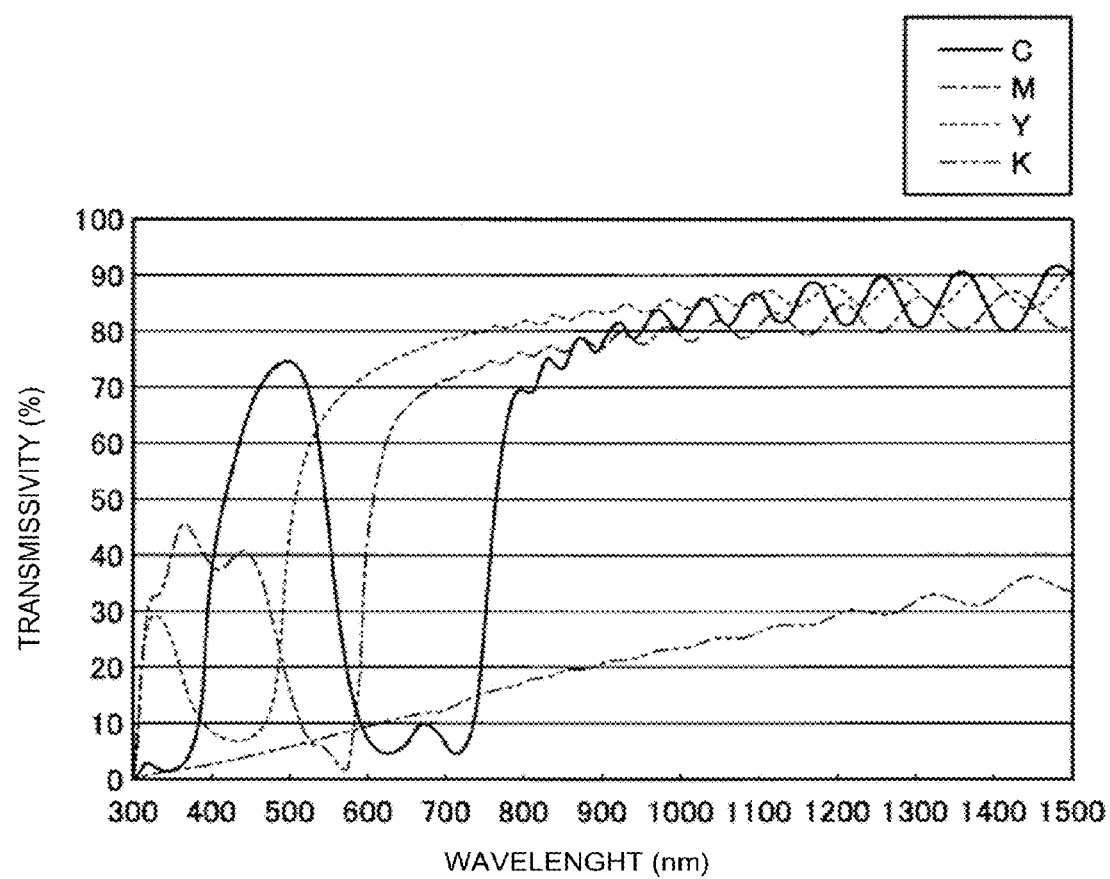
FIG. 2 is a diagram showing an example of spectral characteristics of respective CMYK colors which are used in a printing method according to the first embodiment.

Here, using FIG. 2, spectral characteristics of ink of each color of CMYK will be described. FIG. 2 is a diagram showing an example of spectral characteristics of the ink of each color of CMYK to be used in a printing method according to the first embodiment. As shown in FIG. 2, the ink of each color of CMY indicates a high transmissivity for a light of a wavelength in a near infrared ray band with a wavelength of not less than 750 nm. In contrast, the ink of K indicates a low transmissivity for a light of a wavelength of any band. In other words, it is found that the ink of K has a high absorptivity for a light of a wavelength of any band.

A black image which an image to be printed on the ID card 1 includes, includes a prescribed region in which a forgery preventing character (an example of a first character) that is a character for preventing forgery of the ID card 1 is to be embedded. The prescribed region includes a first region in which the forgery preventing character is to be printed and a second region other than a first region. A black image in a second region is printed with a K ink, and the forgery preventing character is printed in the first region in a black color (a black color which is different from the K ink in a transmissivity at a near infrared ray band) in which CMY inks are superposed. By this means, the forgery preventing character is embedded in the black image. The forgery preventing character embedded in the black image cannot be visually recognized by the naked eye, but it can be detected using a detection device capable of detecting a light of a near infrared ray band.

Figure 3:
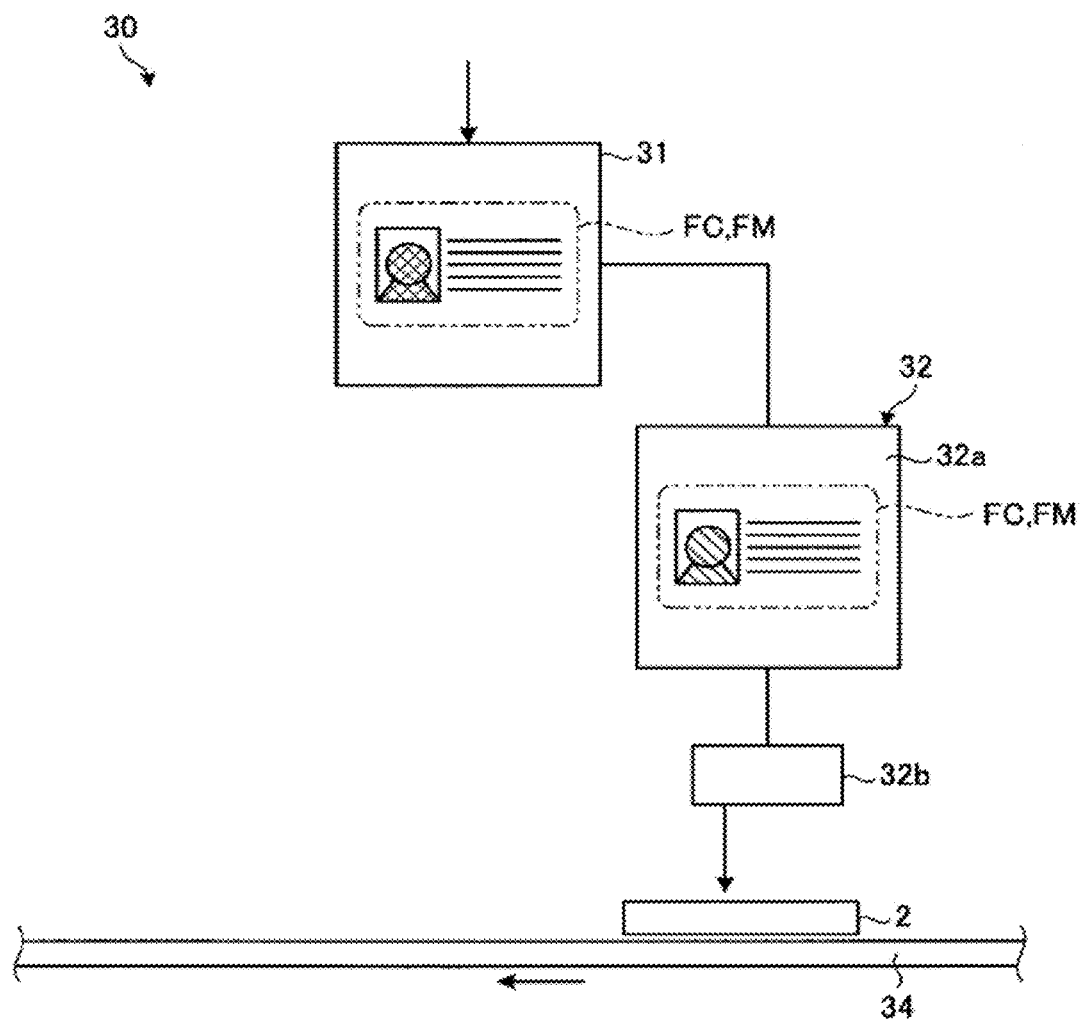
FIG. 3 is a diagram showing an example of a schematic configuration of the ID card manufacturing device according to the first embodiment.

Next, an ID card manufacturing device according to the present embodiment will be described using FIG. 3. FIG. 3 is a diagram showing an example of a schematic configuration of the ID card manufacturing device according to the first embodiment. As shown in FIG. 3, in the present embodiment, an ID card manufacturing device 30 includes an image processing section 31, an ink jet printing section 32 and a conveying section 34.

The image processing section 31 functions as a control section which performs a print processing of an image to the substrate 2 in the ID card manufacturing device 30. The ink jet printing section 32 functions as a printing section which prints an image on the substrate 2. The conveying section 34 conveys the substrate 2 to a position capable of printing an image by the ink jet printing section 32.

The image processing section 31 generates data (hereinafter, called image data) of an original image (an example of a first image) that is an image to be printed on the substrate 2. The image processing section 31 divides the image data, in accordance with a prescribed ratio (hereinafter, called a division ratio) into data (hereinafter, called monochrome image data) of a monochrome image FM (an example of a first black image) to be printed with a K ink, and data (hereinafter, called a color image data) of a color image FC (an example of a second image) to be printed with CMY inks.

Specifically, the image processing section 31 color-separates the image data into components of C, M, Y and K colors, by an error diffusion method, for example. For example, the image processing section 31 calculates values of C, M and Y components, for each pixel (dot) of the original image. The image processing section 31 sets the lowest value of the C, M, Y components to a value of the K component. Further, the image processing section 31 subtracts the value of the K component from the values of the C, M, Y components, to newly set the subtracted values to values of C, M, Y components, respectively. In this manner, the image processing section 31 calculates the values of the C, M, Y and K components for each dot.

The image processing section 31 may decompose the image data into components of respective CMYK colors by other method different from the error diffusion method. In addition, the image processing section 31 may decompose the image data into a plurality of color components including other color component (for example, light cyan, light magenta, white color, and fluorescent color).

The image processing section 31 generates monochrome image data from the K component of the original image. Further, the image processing section 31 generates color image data from the C, M, and Y components of the original image.

The monochrome image FM and the color image FC are synthesized (combined), and thereby the former original image is printed on the substrate 2. In addition, the image processing section 31 may divide the image data into three or more data for each color, or may divide it for each position (coordinate).

Figure 4:
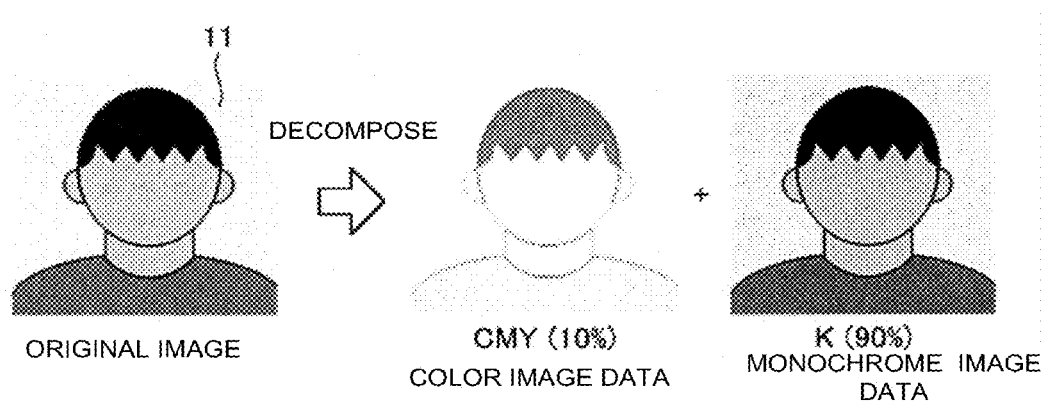
FIG. 4 is a diagram for explaining an example of a division processing of image data by the ID card manufacturing device according to the first embodiment.

FIG. 4 is a diagram for explaining an example of a division processing of image data by the ID card manufacturing device according to the first embodiment. For example, as shown in FIG. 4, the image processing section 31 divides the face image 11 included in the original image, into color image data in which CMY components are 10%, and monochrome image data in which a K component is 90%. In the present embodiment, the image processing section 31 divides the inputted image data into color image data in which CMY components are 10%, and monochrome image data in which a K component is 90%. The image processing section may divide the original image into color image data and monochrome image data so that the sum of the CMY components and the K component becomes 100%, and the division ratio is not limited to the above-described ratio.

Returning to FIG. 3, the ink jet printing section 32 includes a first storage section 32a and an ink jet head 32b.

The first storage section 32a stores the color image data and the monochrome image data which are inputted from the image processing section 31. The ink jet head 32b prints an original image on the substrate 2 by an ink jet method.

Specifically, the ink jet head 32b ejects CMY inks to the substrate 2. By this means, the ink jet head 32b forms dots of the CMY components on the substrate 2, to form the color image FC based on the color image data. Subsequently, the ink jet head 32b ejects a K ink to the substrate 2. By this means, the ink jet head 32b forms dots of the K component on the substrate 2, to form the monochrome image FM based on the monochrome image data.

The conveying section 34 conveys the substrate 2 before printed with the original image to a position immediately below the ink jet head 32b. In the present embodiment, the conveying section 34 conveys the substrate 2 to a position immediately below the ink jet head 32b, by a roller, a belt or the like, for example.

After that, the conveying section 34 conveys the substrate 2 printed with an image to a prescribed position. And, when the substrate 2 and the film M (not shown) are superposed at the prescribed position, and thereby the ID card 1 is manufactured, the conveying section 34 conveys the ID card 1 outside the ID card manufacturing device 30, and thereby issues the ID card 1.

In the present embodiment, the ink jet printing section 32 prints the color image FC and the monochrome image FM on the substrate 2. But without being limited to this, the ink jet printing section 32 may print the color image FC and the monochrome image FM on the film F, or may print one of the color image FC and the monochrome image FM on the substrate 2 and print the other on the film F.

The ID card manufacturing device 30 according to the present embodiment can embed a forgery preventing character in the monochrome image FM divided from the original image. Specifically, the ink jet printing section 32, in the prescribed region in which the forgery preventing character is to be embedded in the monochrome image FM, prints a black image of the second region other than the first region in which the forgery preventing character is to be printed, with a K ink, and prints the forgery preventing character in the first region in a black color in which the CMY inks are superposed. By this means, since it is possible to embed the forgery preventing character in the original image in a state invisible by the naked eye, when embedding the forgery preventing character in personal information, it is possible to enhance resistance to the forgery of the ID card 1, without deteriorating the image quality of the personal information.

Further, in the present embodiment, the image processing section 31 detects a density of the monochrome image FM in the prescribed region in which the forgery preventing character is to be embedded, and determines a size of the forgery preventing character, in accordance with the detected density. And, the ink jet printing section 32 prints the forgery preventing character having the size determined by the image processing section 31 in a black color in which the CMY inks are superposed. By this means, it is possible to prevent that a forgery preventing character with a small size is printed in a region having a low density in the monochrome image FM, and thereby it becomes impossible to recognize the forgery preventing character, or a forgery preventing character with a large size is printed in a region having a high density in the monochrome image FM, and thereby it becomes possible to easily recognize the forgery preventing character. That is, since it is possible to print a forgery preventing character on the monochrome images FM having any density, it is possible to print a forgery preventing character in the monochrome image FM with a density which differs depending on a person, such as the face image 11.

Figure 5A:
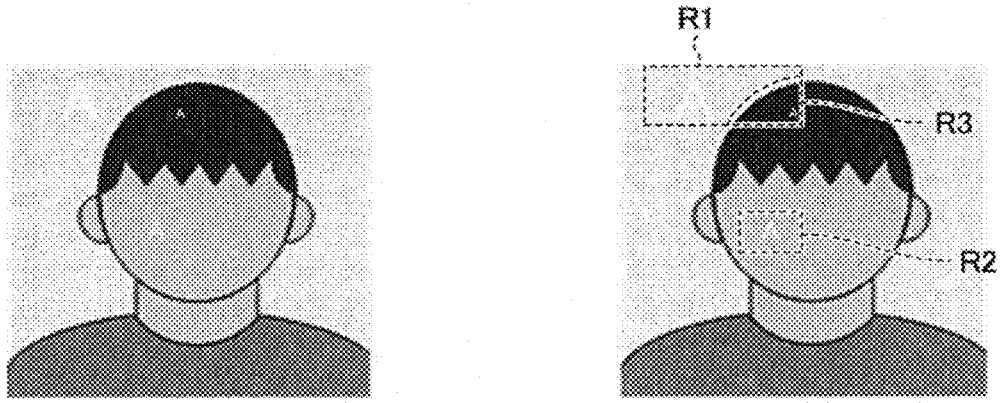
FIG. 5A, FIG. 5B and FIG. 5C are diagrams for explaining an example of a determination processing of a size of a forgery preventing character by the ID card manufacturing device according to the first embodiment.
Figure 5B:
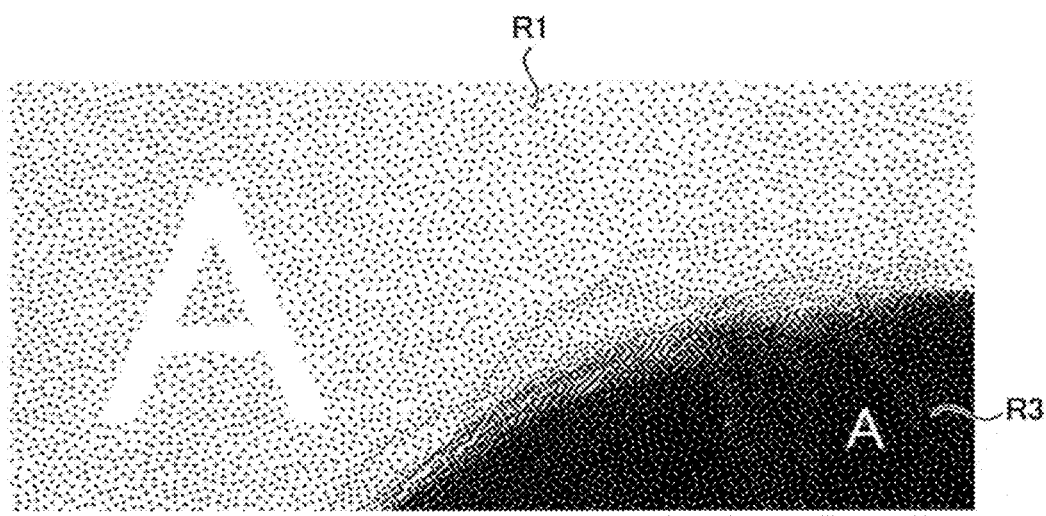
Figure 5C:
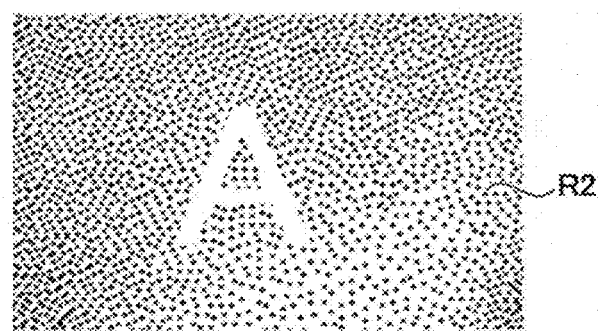

Next, a determination processing of a size of a forgery preventing character in the ID card manufacturing device 30 according to the present embodiment will be described using FIG. 5A, FIG. 5B and FIG. 5C. FIG. 5A, FIG. 5B and FIG. 5C are diagrams for explaining an example of a determination processing of a size of a forgery preventing character by the ID card manufacturing device 30 according to the first embodiment.

FIG. 5A is an example in which a forgery preventing character has been embedded in the form of an outline character, in each of a low density region R1, a medium density region R2 and a high density region R3 of the monochrome image FM. FIG. 5B is an enlarged diagram of the forgery preventing characters embedded in the form of an outline character in the low density region R1 and the high density region R3. FIG. 5C is an enlarged diagram of the forgery preventing character embedded in the form of an outline character in the medium density region R2.

The low density region R1 is a region in which an area of dots per unit area (a density of the monochrome image FM) is not more than a first density N1, as shown in FIG. 5A and FIG. 5B. The high density region R3 is a region in which an area of dots per unit area is not less than a third density N3 higher than the first density N1, as shown in FIG. 5A and FIG. 5B. The medium density region R2 is a region in which an area of dots per unit area is a second density N2 that is higher than the first density N1 and lower than the third density N3, as shown in FIG. 5A and FIG. 5C.

As shown in FIG. 5B, when an outline character is embedded in the low density region R1, if a size of the outline character is small, the outline character is buried in the second region other than the first region that is the outline character, and thereby the outline character cannot be recognized. On the other hand, as shown in FIG. 5B and FIG. 5C, the medium density region R2 and the high density region R3 which have a high density do not generally occupy a large region in the whole of the monochrome image FM, it is impossible to embed an outline character with a large size. In addition, when an outline character with a large size is embedded in a region with a high density, the outline character will easily be recognized.

Accordingly, in the present embodiment, the image processing section 31 detects an image density D of a prescribed region in which a forgery preventing character is to be embedded in the monochrome image FM. And, when the detected image density D is not more than the first density N1, the image processing section 31 determines a character size S1, as a size of the forgery preventing character. In addition, when the detected image density D is the second density N2, the image processing section 31 determines a character size S2 smaller than the character size S1, as a size of the forgery preventing character. In addition, when the detected image density D is not less than the third density N3, the image processing section 31 determines a character size S3 smaller than the character size S2, as a size of the forgery preventing character.

By this means, it is possible to prevent that a forgery preventing character with a small size is printed in a region having a low density in the monochrome image FM, and thereby it becomes impossible to recognize the forgery preventing character, or a forgery preventing character with a large size is printed in a region having a high density in the monochrome image FM, and thereby it becomes possible to easily recognize the forgery preventing character. According to the present embodiment, it is possible to print a forgery preventing character on the monochrome images FM having any density.

FIG. 6 is a diagram showing an example of a character size determination table which is used for determining a size of a forgery preventing character in the ID card manufacturing device according to the first embodiment. In the present embodiment, the ID card manufacturing device 30 includes a storage section not shown which stores a character size determination table 600 shown in FIG. 6. As shown in FIG. 6, the character size determination table 600 stores the image density D (D≤N1, N1<D<N3, N3≤D) of a prescribed region in the monochrome image FM, and a size (character sizes S1, S2, S3) of a forgery preventing character when embedding the forgery preventing character in the monochrome image FM of the image density D, in association with each other.

The image processing section 31 determines a size of a forgery preventing character, with reference to the character size determination table 600 (an example of a table). Specifically, when having detected a density not more than the first density N1 as the image density D in a prescribed region, the image processing section 31 determines the character size S1 associated with the image density D of not more than the first density N1 in the character size determination table 600, as a size of a forgery preventing character. In addition, when having detected the image density D (second density N2) higher than the first density N1 and lower than the third density N3, as the image density D in the prescribed region, the image processing section 31 determines the character size S2 associated with the image density D higher than the first density N1 and lower than the third density N3 in the character size determination table 600, as a size of a forgery preventing character. In addition, when having detected a density not less than the third density N3 as the image density D in the prescribed region, the image processing section 31 determines the character size S3 associated with the image density D of not less than the third density N3 in the character size determination table 600, as a size of a forgery preventing character.

In addition, in the present embodiment, the image processing section 31 determines any one character size out of the three character sizes S1, S2, S3, as a size of a forgery preventing character, in accordance with the detected image density D. The image processing section 31 may be one which determines any one character size from the two or more character sizes as a size of a forgery preventing character, in accordance with the detected image density D, and is not limited to the present embodiment.

For example, when the monochrome image FM is an image in which a density changes based on an area of dots per unit area, the image processing section 31 determines a size of a forgery preventing character so that a line width d2 of the forgery preventing character is larger than a distance d1 between dots in a prescribed region. Specifically, the image processing section 31 calculates a distance d1 between dots in the monochrome image FM, based on the detected image density D of the prescribed region. And the image processing section 31 determines a size of a forgery preventing character, in accordance with the following expression (1) so that the line width d2 of the forgery preventing character becomes larger than the calculated distance d1.

$$d2 > d1 \times \alpha \text{ (here, } \alpha \text{ is an integer not less than 1)} \quad (1)$$

When a size of a forgery preventing character is determined by the image processing section 31, the ink jet printing section 32 prints, in the prescribed region in which the forgery preventing character is to be embedded, a black image of a second region other than a first region in which the forgery preventing character is to be printed, in a 90% black color with a K ink. On the other hand, the ink jet printing section 32 prints the first region (that is, a region of an outline character) in the prescribed region in a 100% black color with CMY inks. Here, since the black colors used for printing the first region and the second region respectively have the approximately same transmissivity in a visible ray band, the first region and the second region are visually recognized as the equal monochrome image FM, by a human visual sense. For the reason, when a forgery preventing character is to be embedded in personal information such as the face image 11, it is possible to enhance the resistance to forgery of the ID card 1, without deteriorating image quality of the personal information.

After that, the ink jet printing section 32 forms the color image FC with dots of CMY components, and the monochrome image FM other than the prescribed region with dots of a K component, on the substrate 2 on which the prescribed region of the monochrome image FM has been printed, and thereby forms an original image in which the monochrome image FM and the color image FC are synthesized on the substrate 2.

In the present embodiment, in order to embed the forge preventing characters of a predetermined number in the prescribed region in the monochrome image FM, the image processing section 31 detects the image density of the prescribed region, and determines the size of the forgery preventing character, in accordance with the detected image density D. However, the image processing section 31 may perform as in the following. When a region in which a forgery preventing character is to be embedded is not previously set in the monochrome image FM, and only the size and the number of the forgery preventing characters are previously set, the image processing section 31 detects image densities D of a plurality of partial regions in the monochrome image FM. And, the image processing section 31 determines, in the monochrome image FM, a partial region having the image density D in accordance with the size and the number of the forgery preventing characters which are previously set, as a region in which the forgery preventing characters are to be embedded, and embeds the forgery preventing characters in the determined region.

Or, when any of a region in which a forgery preventing character is to be embedded, the number of the forgery preventing characters, and a size of the forgery preventing character is not set, in the monochrome image FM, the image processing unit 31 may determine all of a region in which a forgery preventing character is to be embedded, a size of the forgery preventing character, and the number of the forgery preventing characters in accordance with the image densities D of a plurality of partial regions in the monochrome image FM.

Figure 7:
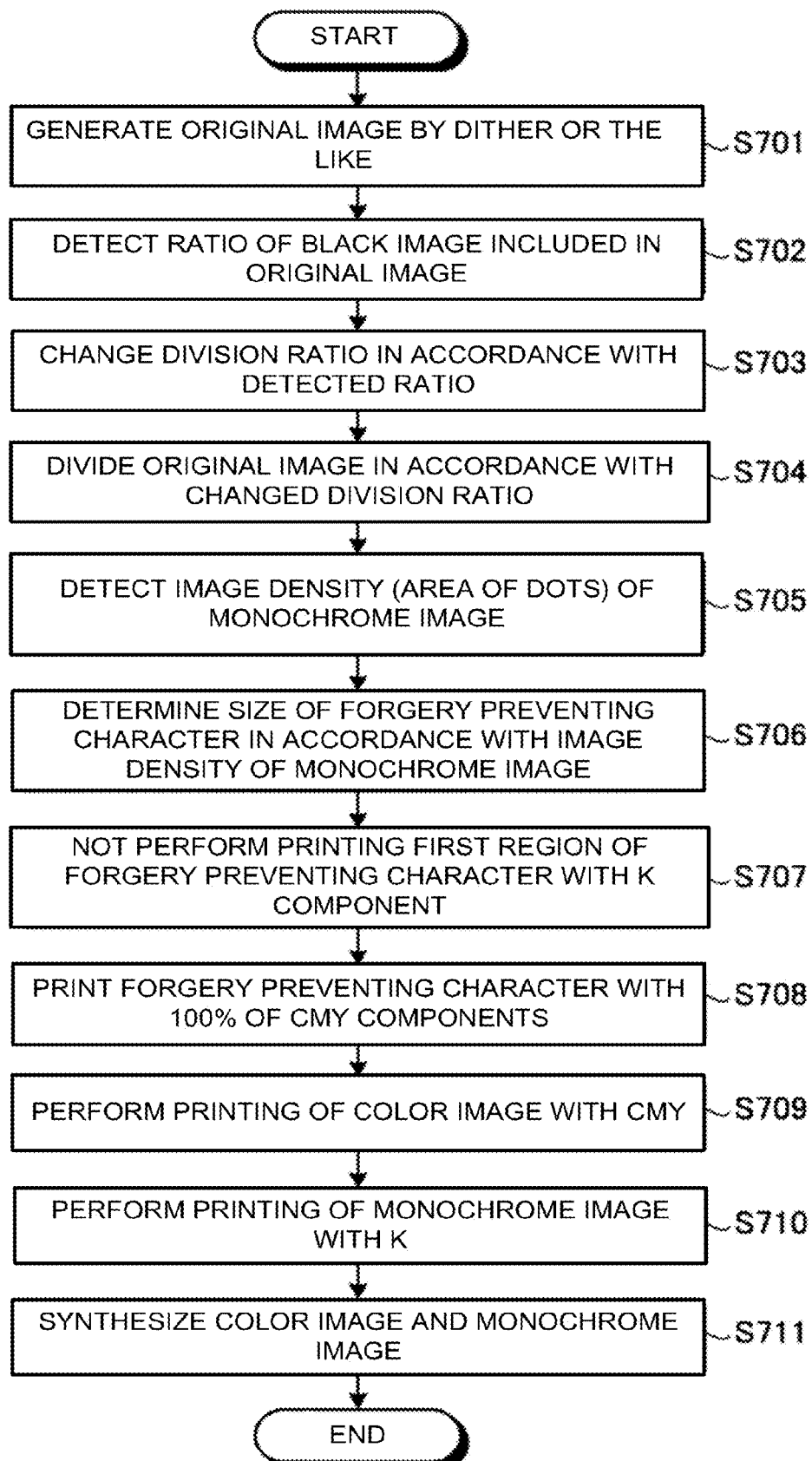
FIG. 7 is a flow chart showing an example of a flow of a print processing of an image by the ID card manufacturing device according to the first embodiment.

Next, a flow of a print processing of an image by the ID card manufacturing device 30 according to the present embodiment will be described using FIG. 7. FIG. 7 is a flow chart showing an example of a flow of a print processing of an image by the ID card manufacturing device according to the first embodiment.

In the present embodiment, the image processing section 31 generates an original image using a dither method or the like (step S701). Next, the image processing section 31 detects a ratio (an example of a first ratio) of a black image included in the generated original image (step S702). Then, the image processing section 31 changes a prescribed division ratio, in accordance with the detected ratio of the black image (step S703).

For example, the face image 11 included in the original image is personal information, and since areas of the black images in the face images 11 are different for each the face image 11, the ratio in the face image does not always become high. Specifically, when a color of hair included in the face image 11 is black, the ratio of the black image in the face image 11 becomes high, but when a color of hair included in the face image 11 is a color of other than black, the ratio of the black image in the face image 11 becomes low. Accordingly, when the detected ratio of the black image is not more than a prescribed value (for example, 50%), the image processing section 31 increases the portion of the K component of the division ratio by a prescribed value portion, and thereby can make the ratio of the black image in the original image high, and can increase the region capable of embedding a forgery preventing character.

Next, the image processing section 31 divides the image data of the original image into monochrome image data and color image data, in accordance with the changed division ratio (step S704). Further, the image processing section 31 detects the image density D (that is an area of dots per unit area, in a prescribed region in the monochrome image FM) of a prescribed region in which a forgery preventing character is to be embedded, in the monochrome image FM based on the monochrome image data (step S705). Then, the image processing section 31 determines a size of the forgery preventing character in accordance with the detected image density D (step S706).

The ink jet printing section 32, in the prescribed region, does not perform printing, with a K ink, a first region in which a forgery preventing character with the determined size is to be printed, but prints a second region except the first region in a 90% black color with the K ink (step S707). Further, the ink jet printing section 32 prints the forgery preventing character in the first region in a 100% black color with CMY inks (step S708).

After that, the ink jet printing section 32 performs printing of the color image FC, on the substrate 2 on which the prescribed region of the monochrome image FM has been printed, with the CMY inks (step S709), and performs printing of the monochrome image FM except in the prescribed region with the K ink (step S710). By this means, the ink jet printing section 32 forms the original image in which the monochrome image FM and the color image FC are synthesized (step S711).

In this manner, according to the printing method according to the first embodiment, since it is possible to print a forgery preventing character in a monochrome image FM of any density, it is possible to print a forgery preventing character in the monochrome image FM with a density which differs depending on a person, such as the face image 11.

Second Embodiment

The present embodiment is an example to print a monochrome image by laser engraving. In the following description, regarding the same portions as the portion in the first embodiment, the description thereof will be omitted.

In the present embodiment, a monochrome image (a black image) out of an original image to be printed on the substrate 2 is printed by laser engraving (LE).

Figure 8:
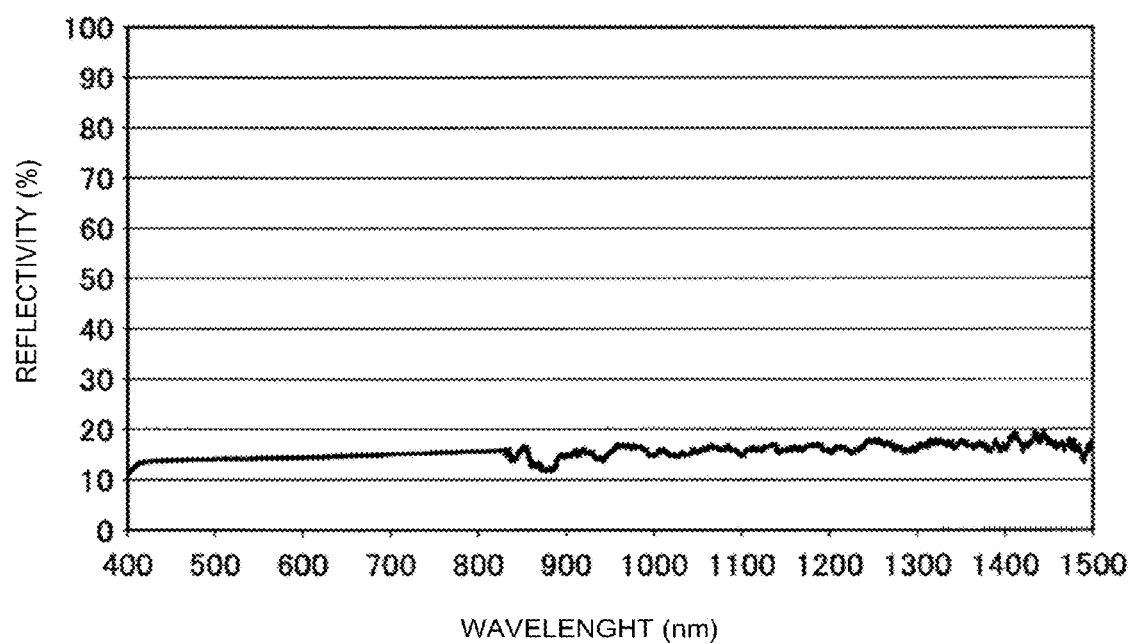
FIG. 8 is a diagram showing an example of a reflectivity of a black image printed by laser engraving.

Here, a reflectivity of a black image printed by laser engraving will be described, using FIG. 8. FIG. 8 is a diagram showing an example of a reflectivity of a black image printed by laser engraving. As shown in FIG. 8, a reflectivity of a black image printed by laser engraving shows a low reflectivity also to a light of a wavelength in a near infrared ray band with a wavelength of not less than 750 nm. In other words, an absorptivity of a black image printed by laser engraving shows a high absorptivity to a light of a wavelength in a near infrared ray band with a wavelength of not less than 750 nm, in the same manner as a black image printed with a K ink. When printing by laser engraving is regarded as printing with ink, it can be regarded that the transmissivity of ink is low in printing by the laser engraving.

Accordingly, in the black image which the image to be printed on the ID card 1 includes, out of the prescribed region in which the forgery preventing character is to be embedded, the second region other than the first region in which the forgery preventing character is to be printed, is printed by laser engraving, and in the first region, the forgery preventing character is printed in a black color in which the CMY inks are superposed. By this means, the forgery preventing character embedded in the black image cannot be visually recognized by the naked eye, but can be detected by a detection device capable of detecting a light of a near infrared ray band.

Figure 9:
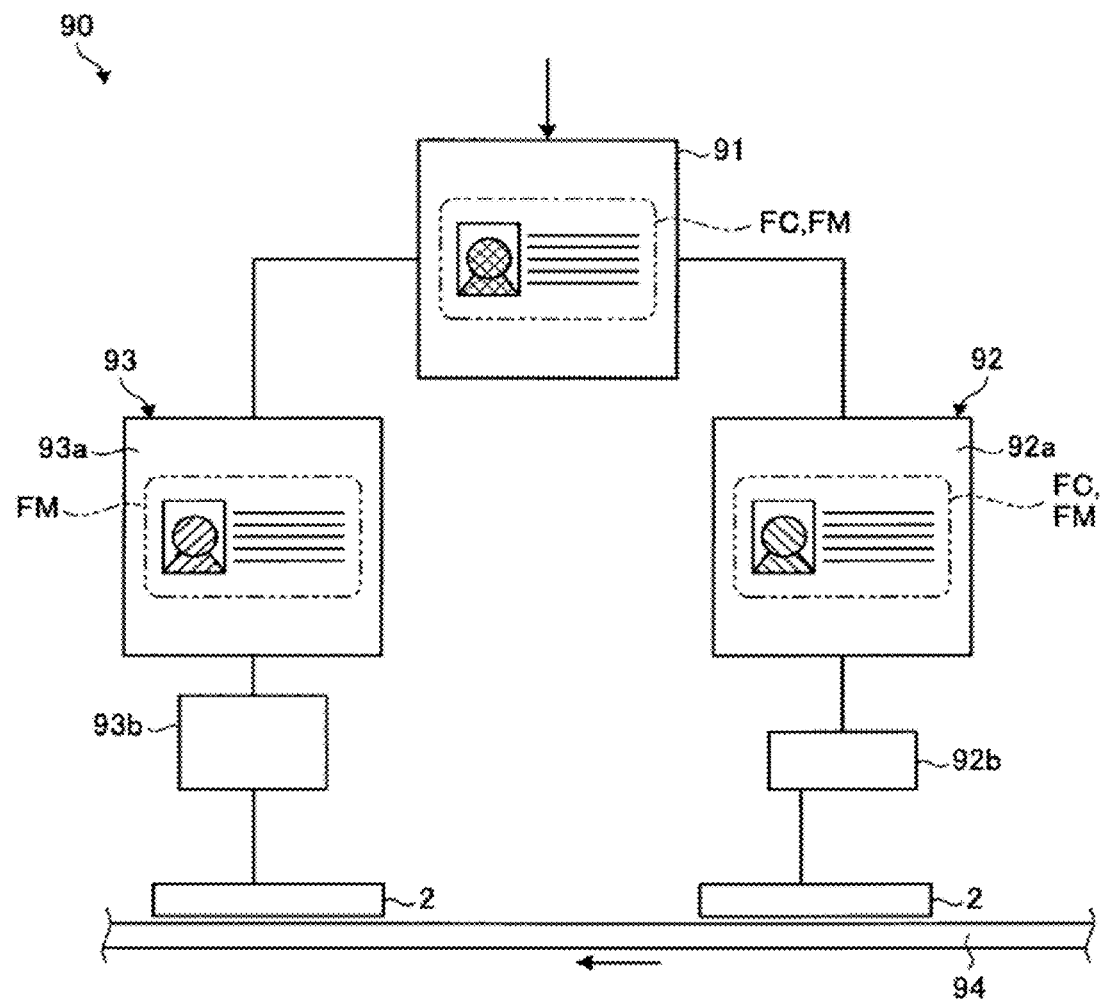
FIG. 9 is a diagram showing an example of a schematic configuration of an ID card manufacturing device according to a second embodiment.

Next, an ID card manufacturing device to which the printing method according to the present embodiment is applied will be described, using FIG. 9. FIG. 9 is a diagram showing an example of a schematic configuration of the ID card manufacturing device according to the second embodiment. As shown in FIG. 9, in the present embodiment, an ID card manufacturing device 90 includes an image processing section 91, an ink jet printing section 92, a laser engraving section 93 and a conveying section 94.

The image processing section 91 inputs monochrome image data into the ink jet printing section 92 and the laser engraving section 93. Further, the image processing section 91 inputs color image data into the ink jet printing section 92.

Figure 10:
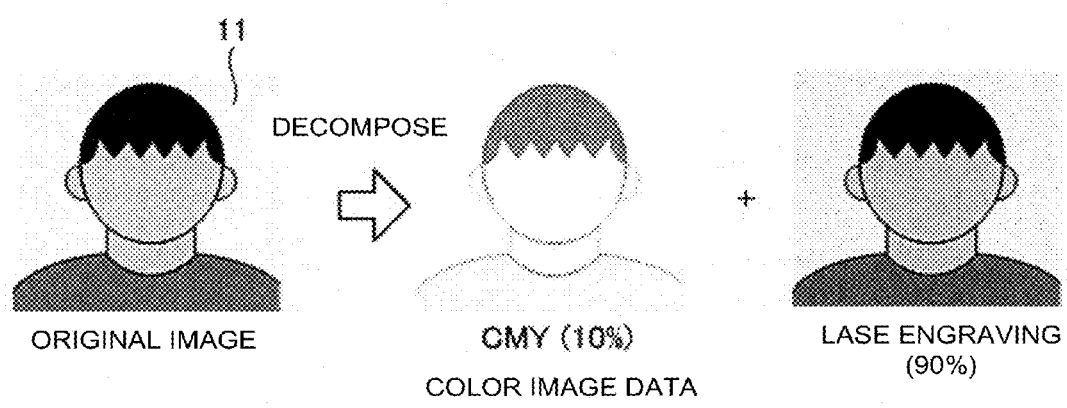
FIG. 10 is a diagram for explaining an example of a division processing of image data by the ID card manufacturing device according to the second embodiment.

Also in the present embodiment, when the image data is inputted, the image processing section 91 divides the image data into monochrome image data and color image data, in accordance with a prescribed division ratio. FIG. 10 is a diagram for explaining an example of a division processing of the image data by the ID card manufacturing device according to the second embodiment. For example, as shown in FIG. 10, the image processing section 91 divides the face image 11 included in the original image into color image data in which CMY components are 10%, and monochrome image data in which a K component to be printed by laser engraving is 90%.

In the present embodiment, the image processing section 91 divides the image data into color image data in which CMY components are 10%, and monochrome image data in which a K component to be printed by laser engraving is 90%. The image processing section 91 may divide the original image into color image data and monochrome image data so that the sum of the CMY component and the K component to be printed by laser engraving becomes 100%, and the division ratio is not limited to the above-described ratio.

Returning to FIG. 9, the ink jet printing section 92 includes a first storage section 92a and an ink jet head 92b. The first storage section 92a stores the color image data and the monochrome image data which are inputted from the image processing section 91. The ink jet head 92b acquires the color image data stored in the first storage section 92a, and prints the color image FC on the substrate 2, based on the acquired color image data. In addition, the ink jet head 92b acquires the monochrome image data stored in the first storage section 92a, and prints a forgery preventing character in the first region on the substrate 2, in a black color in which the CMY inks are superposed, based on the acquired monochrome image data.

The laser engraving section 93 includes a second storage section 93a and a laser irradiation section 93b. The second storage section 93a stores the monochrome image data inputted from the image processing section 91. The laser irradiation section 93b records a black image in the second region except the first region in which the forgery preventing character is to be printed, in the monochrome image FM on the substrate 2, with a laser engraving system, based on the monochrome image data stored in the second storage section 93a.

The laser irradiation section 93b uses a YAG laser of a diode laser with a wavelength of 900 nm-1600 nm, for example. The laser irradiation section 93b may use another laser. The laser irradiation section 93b irradiates the surface of the substrate 2 with a laser light having a wavelength of 1064 nm, and thereby records the monochrome image FM on the substrate 2.

The conveying section 94 conveys the substrate 2 immediately below the ink jet head 92b and the laser irradiation section 93b. That is, the conveying section 94 conveys the substrate 2 to a position where an image can be printed by the ink jet printing section 92, and a position where an image can be recorded by the laser engraving section 93.

Also the ID card manufacturing device 90 according to the present embodiment embeds a forgery preventing character in the prescribed region in the monochrome image FM divided from the original image. Specifically, the laser engraving section 93, in the prescribed region in the monochrome image FM, prints (records) a black image in the second region other than the first region in which the forgery preventing character is to be printed. In addition, the ink jet printing section 92 prints the forgery preventing character in the first region in a black color in which the CMY inks are superposed. By this means, it is possible to embed the forgery preventing character in the original image in a state invisible by the naked eye. When embedding a forgery preventing character in personal information such as the face image 11, it is possible to enhance resistance to the forgery of the ID card 1 without deteriorating the image quality of the personal information.

Further, in the present embodiment, the image processing section 91 detects a density of the prescribed region of the monochrome image FM in which the forgery preventing character is to be printed, and determines a size of the forgery preventing character in accordance with the detected density. Then, the ink jet printing section 92 prints the forgery preventing character having the size determined by the image processing section 91 in a black color in which the CMY inks are superposed. By this means, it becomes possible to prevent that a forgery preventing character with a small size is printed in a region having a low density in the monochrome image FM, and thereby it becomes impossible to recognize the forgery preventing character, or a forgery preventing character with a large size is printed in a region having a high density in the monochrome image FM, and thereby it becomes possible to easily recognize the forgery preventing character. That is, since it is possible to print the forgery preventing character in the monochrome image FM having any density, it is possible to print the forgery preventing character in the monochrome image FM with a density which differs depending on a person, such as the face image 11.

Figure 11:
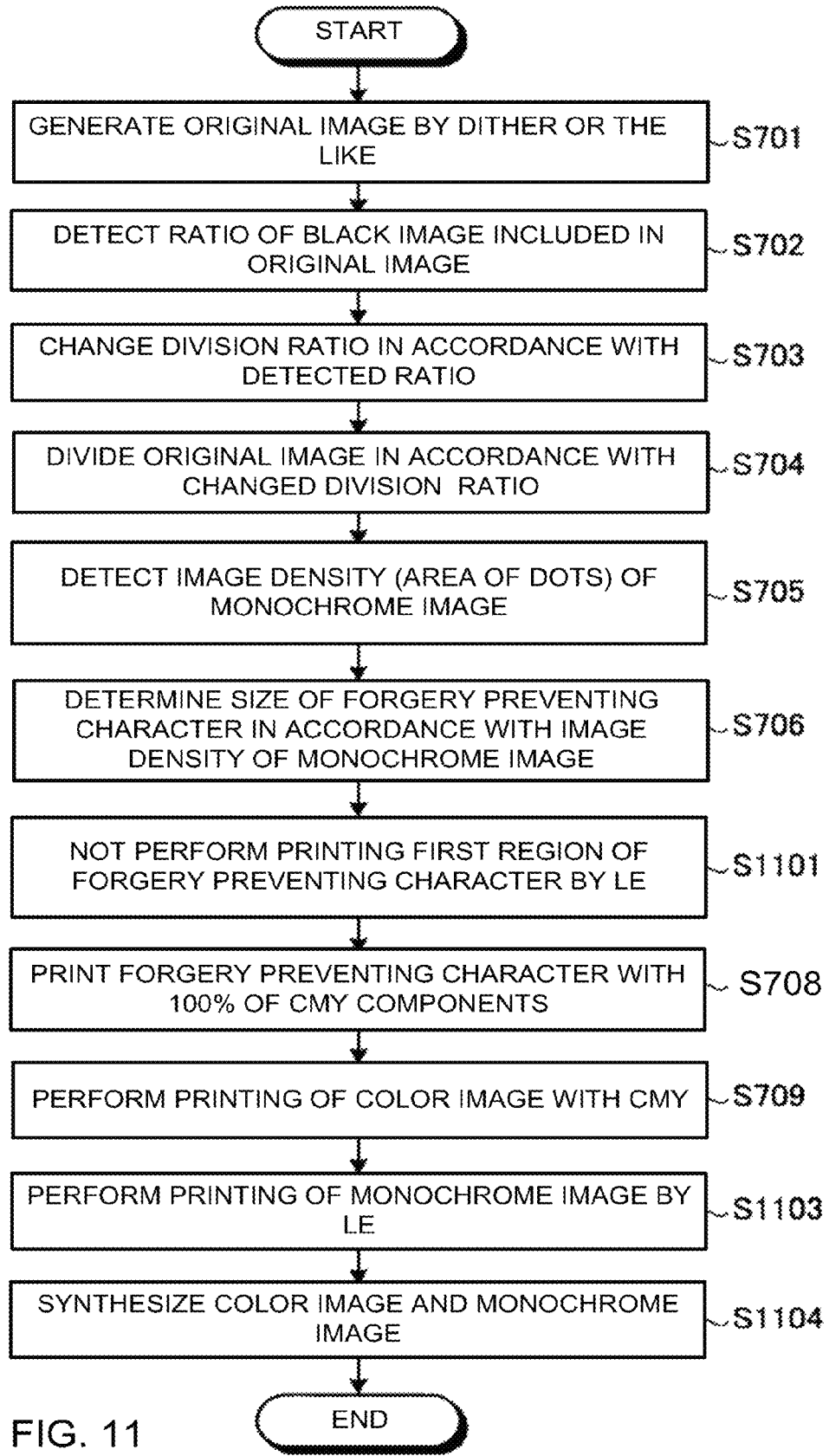
FIG. 11 is a flow chart showing an example of a flow of a print processing of an image by the ID card manufacturing device according to the second embodiment.

Next, a flow of a print processing of an image by the ID card manufacturing device 90 according to the present embodiment will be described, using FIG. 11. FIG. 11 is a flow chart showing an example of a flow of a print processing of an image by the ID card manufacturing device according to the second embodiment. The same symbols as the symbols given to the processes of FIG. 7 are given to the same processes as the processes shown in FIG. 7 which have been described in the first embodiment, and the detailed description thereof will be omitted.

The laser engraving section 93 does not perform printing by laser engraving to the first region in which a forgery preventing character with the determined size is to be printed, but performs printing to the second region except the first region in a 90% black color by laser engraving (step S1101). Further, the ink jet printing section 92 prints the forgery preventing character in the first region in a 100% black color with the CMY inks (step S708).

After that, the ink jet printing section 92 performs printing of the color image FC on the substrate 2 on which the prescribed region of the monochrome image FM has been printed, with the CMY inks (step S709). Further, the laser engraving section 93 performs printing of the monochrome image FM except in the prescribed region, on the substrate 2 on which the prescribed region of the monochrome image FM has been printed, by laser engraving (step S1103). By this means, the ink jet printing section 92 and the laser engraving section 93 forms an original image in which the monochrome image FM and the color image FC are superposed, on the substrate 2 (step S1104).

In the present embodiment, the printing by the ink jet printing section 92 and the recording by the laser engraving section 93 are both performed on the substrate 2, but when the substrate 2 is formed of synthetic resin such as polycarbonate, it is difficult to perform printing by the ink jet printing section 92 to the substrate 2. In addition, it is difficult to perform recording by the laser engraving section 93 to the film F. For the reason, the ID card manufacturing device 90 may perform printing by the ink jet printing section 92 to the film F, and may perform recording by the laser engraving section 93 to the substrate 2. In this case, the film F on which the printing by the ink jet printing section 92 has been performed is superposed on the substrate 2 on which the recording by the laser engraving section 93 has been performed, and thereby printing of the prescribed image on the ID card is finished.

In this manner, according to the printing method according to the second embodiment, the same action and effect as the first embodiment can be obtained.

Third Embodiment

The present embodiment is an example of a detection device which detects a forgery preventing character from the ID card manufactured by one of the ID card manufacturing devices according to the first and second embodiments.

Figure 12:
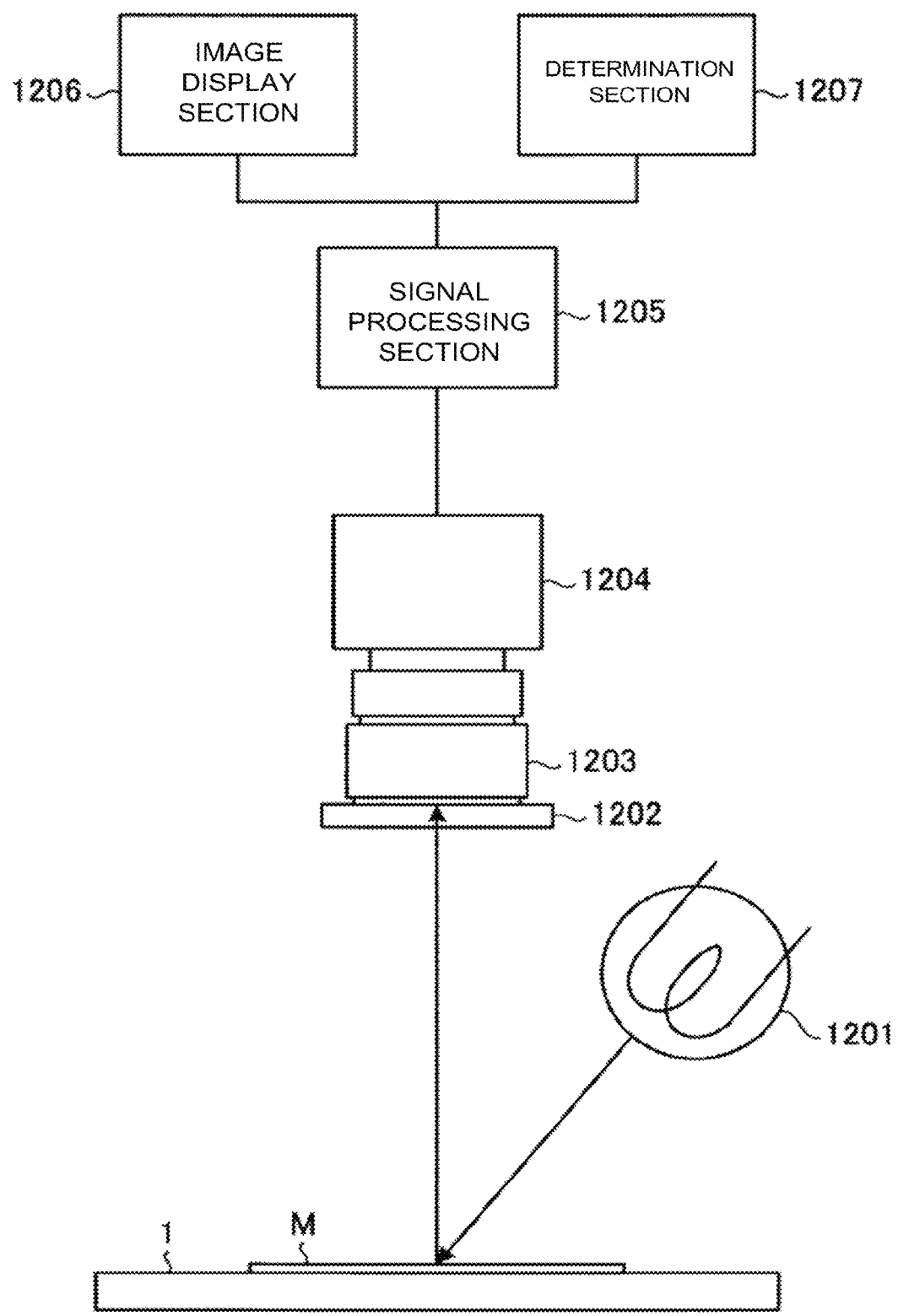
FIG. 12 is a diagram showing an example of a functional configuration of a detection device according to a third embodiment.

FIG. 12 is a diagram showing an example of a functional configuration of a detection device according to a third embodiment. As shown in FIG. 12, a detection device according to the present embodiment includes an illumination section 1201, a filter 1202, a lens 1203, a sensor 1204, a signal processing section 1205, an image display section 1206 and a determination section 1207.

The illumination section 1201 irradiates a forgery preventing character M printed on the ID card 1 with a light having a wavelength of a near infrared ray band. For example, the illumination section 1201 may be a light source capable of emitting a light of a wavelength of a near infrared ray band, such as a halogen illumination and a white light lamp capable of emitting a light of a wavelength from a band of a visible light to a near infrared ray band, an LED (Light Emitting Diode) illumination capable of emitting a light of a wavelength of a near infrared ray band, and so on, and the illumination section 1201 is not limited to the exemplified light source.

The forgery preventing character M printed on the ID card 1 is printed in a black color (a color in which the CMY inks are superposed) which can transmit a light of a wavelength of a near infrared ray band. For the reason, the light which is emitted from the illumination section 1201 and illuminates the forgery preventing character M is transmitted through the forgery preventing character M and is reflected by the substrate 2. On the other hand, a portion except the forgery preventing character M out of the black image printed on the ID card 1 is printed in the K component absorbing a light of a wavelength of a near infrared ray band, or by laser engraving. For the reason, the light which is emitted from the illumination section 1201 and illuminates the black image except the forgery preventing character M is absorbed in the black image, and thereby the reflectivity of the light is decreased.

The filter 1202 cuts a light of a wavelength (for example, a wavelength of a band of a visible ray) shorter than a wavelength of a near infrared ray band, out of the light reflected by the ID card 1. By this means, only a light of a wavelength of a near infrared ray band passes through the filter 1202, and is detected by the sensor 104 via the lens 1203. Here, the sensor 1204 is composed of a CCD camera, a CMOS camera or the like which can detect a light of a wavelength of a near infrared ray band.

The light detected by the sensor 1204 is converted into an image signal, and the image signal is sent to the signal processing section 1205. The signal processing section 1205 outputs the image signal sent from the sensor 1204 to the image display unit 1206 and the determination section 1207.

The image display section 1206 displays an image based on the image signal inputted from the signal processing section 1205. The image display section 1206 displays an image of the forgery preventing character M shown in FIG. 5A when the forgery preventing character M is printed on the ID card 1. Accordingly, a user of the detection device confirms an image displayed on the image display section 1206, and thereby can determine authenticity of the ID card 1. In addition, the determination section 1207 identifies an image printed on the ID card 1 based on the image signal inputted from the signal processing section 1205, and determines authenticity of the ID card 1 from the identified image.

In this manner, according to the detection device according to the third embodiment, it is possible to detect the forgery preventing character M embedded in the black image, by using the detection device capable of detecting a light of a wavelength of a near infrared ray band.

Fourth Embodiment

The present embodiment is an example to print a region of at least a part of a monochrome image of a print target, using a K ink, at a density which is not more than a density previously set for the relevant region and corresponds to forgery preventing information. In the following description, the description about the same configuration as the configuration in the first embodiment will be omitted.

Also in the present embodiment, the ID card manufacturing device 30 can embed forgery preventing information in the monochrome image FM divided from the original image. Specifically, the ink jet printing section 32 prints an embedded region (an example of the first region) that is a region that is at least a part of the monochrome image FM, using a black color (in the present embodiment, a black color of a K ink) of which transmissivity of a light in a near infrared ray band is a first transmissivity, and at an embedding density. Here, the embedding density is a density which is not more than a prescribed density (an example of a first density) that is a density previously set for the embedded region, and corresponds to the forgery preventing information. In addition, the prescribed density is a density of a region in which the forgery preventing information is to be printed in the monochrome image FM. In the following, the prescribed density may be written as a prescribed density of the monochrome image FM.

Furthermore, when the embedding density is lower than the prescribed density, the ink jet printing section 32 prints the embedded region, using a black color in which CMY inks are superposed, so that the density of the embedded region becomes equal to the prescribed density, to supplement the density. In the present embodiment, the ink jet printing section 32 prints the embedded region in a black color in which the CMY inks are superposed, to supplement the density, but may be one which prints the embedded region in a black color with a transmissivity of a light at a near infrared ray band that is different from a transmissivity of the K ink By this means, since the forgery preventing information can be embedded in the original image in a state invisible by the naked eye, and when the forgery preventing information is embedded in personal information, such as the face image 11 and the character information 12, it is possible to enhance resistance to the abuse of the ID card 1 without deteriorating the image quality of the personal information.

Next, a print processing of the face image 11 in the ID card manufacturing device 30 according to the present embodiment will be described, using FIG. 13A and FIG. 13B. FIG. 13A and FIG. 13B are diagrams for explaining an example of a print processing of the face image by the ID card manufacturing device according to the fourth embodiment.

FIG. 13A is an example in which a plurality of embedded regions r1, r2, r3, r4 which the face image 11 in the monochrome image FM includes are respectively printed using a K ink at different embedding densities d. FIG. 13B is an enlarged diagram of the embedded regions r1, r2, r3 and, r4. In the present embodiment, the image processing section 31 determines parts of the region of the background image of the face image 11, as the embedded regions r1, r2, r3 and r4 (in the following description, when it is not necessary to discriminate the embedded regions r1, r2, r3, r4 and they are described as the embedded regions r).

In the present embodiment, the image processing section 31 determines the four embedded regions r1, r2, r3 and r4 as the embedded regions, but the image processing section 31 changes the number of the embedded regions r in accordance with the forgery preventing information to be embedded in the monochrome image FM. For example, when the forgery preventing information to be embedded in the monochrome image FM corresponds to one embedding density d, the image processing section 31 determines one region in the monochrome image FM as the embedded region r.

In the present embodiment, the image processing section 31 sets a prescribed density of the monochrome image FM to 100%, and changes the embedding density d in the range of 0%-100% of the prescribed density in accordance with the forgery preventing information. By this means, a density (that is, the embedding density d) of a black image printed to the embedded region r with a K ink becomes information indicating the forgery preventing information embedded in the monochrome image FM.

FIG. 14 is a table showing an example of the relation between forgery preventing information to be embedded in the monochrome image and an embedding density indicating the forgery preventing information, in the ID card manufacturing device according to the fourth embodiment. As shown in FIG. 14, in the present embodiment, the image processing section 31 stores an embedding density table T which associates a code that is an example of the forgery preventing information with a density indicating the code. The image processing section 31 sets the density associated with the code to be embedded in the monochrome image FM to the embedding density d. And the ink jet printing section 32 prints the embedded region r using the K ink at the embedding density d set by the image processing section 31.

For example, when embedding a code: "2" in the embedded region r1, the image processing section 31 sets a density: 66.6% associated with the code: "2" in the embedding density table T, to the embedding density d. In addition, when embedding a code: "0" in the embedded region r2, the image processing section 31 sets a density: 0% associated with the code: "0" in the embedding density table T, to the embedding density d. In addition, when embedding a code: "1" in the embedded region r3, the image processing section 31 sets a density: 33.3% associated with the code: "1" in the embedding density table T, to the embedding density d. In addition, when embedding a code: "3" in the embedded region r4, the image processing section 31 sets a density: 100% associated with the code: "3" in the embedding density table T, to the embedding density d.

And then, the ink jet printing section 32, as shown in FIG. 13B, prints the embedded region r1 using the K ink at the embedding density d: 66.6%. The ink jet printing section 32, as shown in FIG. 13B, prints the embedded region r2 using the K ink at the embedding density d: 0%. The ink jet printing section 32, as shown in FIG. 13B, prints the embedded region r3 using the K ink at the embedding density d: 33.3%. The ink jet printing section 32, as shown in FIG. 13B, prints the embedded region r4 using the K ink, at the embedding density d: 100%. By this means, it is possible to embed the forgery preventing information "2013" in the embedded regions r1, r2, r3, and r4.

In the present embodiment, the image processing section 31 sets a density in accordance with the code to be embedded in the monochrome image FM, out of the densities of four gradations, as the embedding density d, but can set any of densities of not more than four gradations or densities of not less than four gradations, as the embedding density d. For example, when there are ten kinds of codes to be embedded in the monochrome image FM, the image processing section 31 sets a density which indicates the code out of densities of ten gradations, as the embedding density d. In addition, when there is one kind of code to be embedded in the monochrome image FM, the image processing section 31 sets a density of one gradation as the embedding density d.

In addition, in the present embodiment, the image processing section 31 determines a rectangular region as the embedded region r, as shown in FIG. 13A and FIG. 13B, but it is only necessary that at least a part of the region in the monochrome image FM is determined as the embedded region r, and the image processing section 31 is not limited to this example. For example, the image processing section 31 may determine a region of a shape of a character code indicating a character, a figure or the like, in the monochrome image FM, as the embedded region r. The image processing section 31 sets the region of a character or a figure as the embedded region r, and prints the embedded region r, using the K ink at the embedding density d of not less than 0%. By this means, since the shape itself of the embedded region r of a character, a figure or the like can be made as information indicating the forgery preventing information embedded in the monochrome image FM, further more information can be embedded in the monochrome image FM, as the forgery preventing information, by the embedding density d and the shape itself of the embedded region r.

In addition, in the present embodiment, it is preferable that the image processing section 31 sets a region in the monochrome image FM, in which a density is uniform over a wide range and also is high as much as possible, as the embedded region r. For example, when the image processing section 31 sets a region in the monochrome image FM in which a density is low as the embedded region r, even when an original image is divided into color image data in which CMY components are 0% and monochrome image data in which a K component is 100%, since an original density (a prescribed density) of the embedded region r is low, a prescribed density of the embedded region r in the monochrome image FM of the K component becomes about 0%, and thereby it becomes impossible to keep a density at the time of printing the embedded region r. Accordingly, when the image processing section 31 prints an original image such as the face image 11 on the ID card 1 such as a driver license, it is preferable to set a region including a K component such as a background image of the face image 11, as the embedded region r. An image of a dark tone including a K component, such as blue and gray color is used for a background image of the face image 11, in many cases, and thereby it is easy to keep a density at the time of printing the embedded region r, with a K ink.

In addition, in the present embodiment, the ink jet printing section 32 prints a reference region rr (an example of a second region) that is a region different from the embedded region r in the monochrome image FM, using a K ink and at a reference density that is a reference of the embedding density d.

Figure 15A:
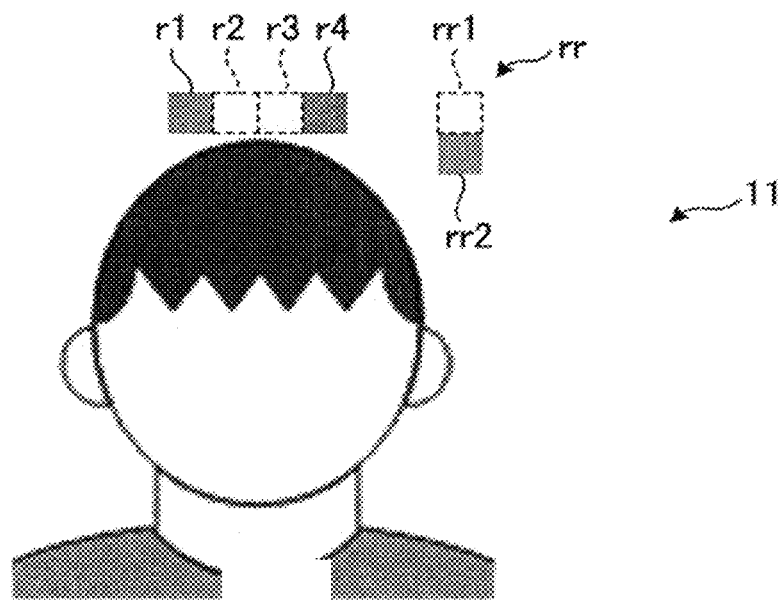
FIG. 15A and FIG. 15B are diagrams for explaining an example of a print processing of a reference region by the ID card manufacturing device according to the fourth embodiment.
Figure 15B:
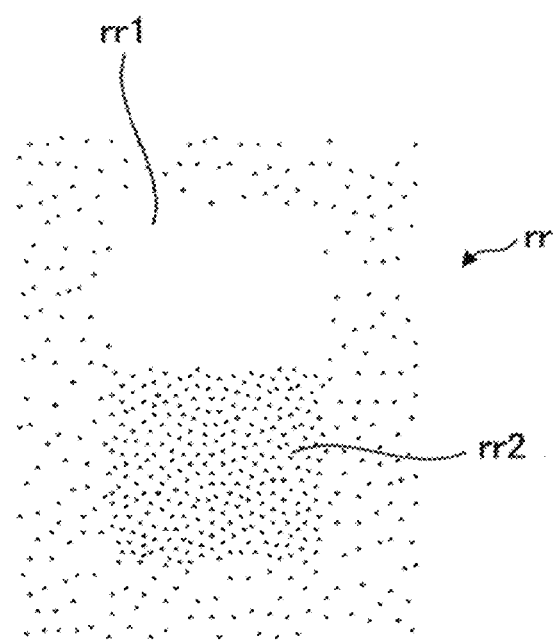

FIG. 15A and FIG. 15B are diagrams for explaining an example of a print processing of a reference region by the ID card manufacturing device according to the fourth embodiment. FIG. 15A is an example in which the reference regions rr are printed at an upper limit density and a lower limit density of the embedding density d. FIG. 15B is an enlarged diagram of the reference regions rr which are respectively printed at the upper limit density and the lower limit density of the embedding density d. As shown in FIG. 15A, in the present embodiment, the image processing section 31 determines a region which is a part of the region of the background image of the face image 11, and is different from the embedded region r, as the reference region rr.

Next, the image processing section 31 selects an upper limit density (embedding density d: 100%), and a lower limit density (embedding density d: 0%) of the embedding density d, or all densities that become the embedding density d, as a reference density. The ink jet printing section 32 prints the reference region rr using a K ink, and at the selected reference density. For example, when an upper limit density and a lower limit density of the embedding density d are selected as the reference densities, the ink jet printing section 32, as shown in FIG. 15B, prints one divided region rr1 out of two divided regions formed by dividing the reference region rr, using a K ink, and at the lower limit density of the embedding density d. In addition, the ink jet printing section 32, as shown in FIG. 15B, prints another divided region rr2 using the K ink, and at the upper limit density of the embedding density d. In addition, the reference region rr which has been printed at the lower limit density of the embedding density d is printed at a complementary density in a black color in which the CMY inks are superposed.

In addition, in the present embodiment, when the embedding density d is lower than the prescribed density of the embedded region r in the monochrome image FM, the ink jet printing section 32 prints the embedded region r using a black color in which CMY inks are superposed so that the density of the embedded region r becomes the prescribed density of the monochrome image FM. For example, the face image 11 is divided into color image data in which CMY components are 10% and monochrome image data in which a K component is 90%, as shown in FIG. 4, and when the embedded region r is printed using a K ink at the embedding density d: 100%, the ink jet printing section 32 does not perform printing of the embedded region r, using a black color in which the CMY inks are superposed.

On the other hand, when the embedded region r is printed using a K ink, at the embedding density d: 50%, the ink jet printing section 32 prints the embedded region r, using a black color in which the CMY inks are superposed, at a density of 50% (hereinafter, called a complementary density) which is determined using the prescribed density of the monochrome image FM as reference. In addition, when the embedded region r is not printed using a K ink (that is, the embedding density d at the time of printing using a K ink is 0%), the ink jet printing section 32 prints the embedded region r, using a black color in which the CMY inks are superposed, at a complementary density of 100% which is determined using the prescribed density of the monochrome image FM as reference.

Figure 16:
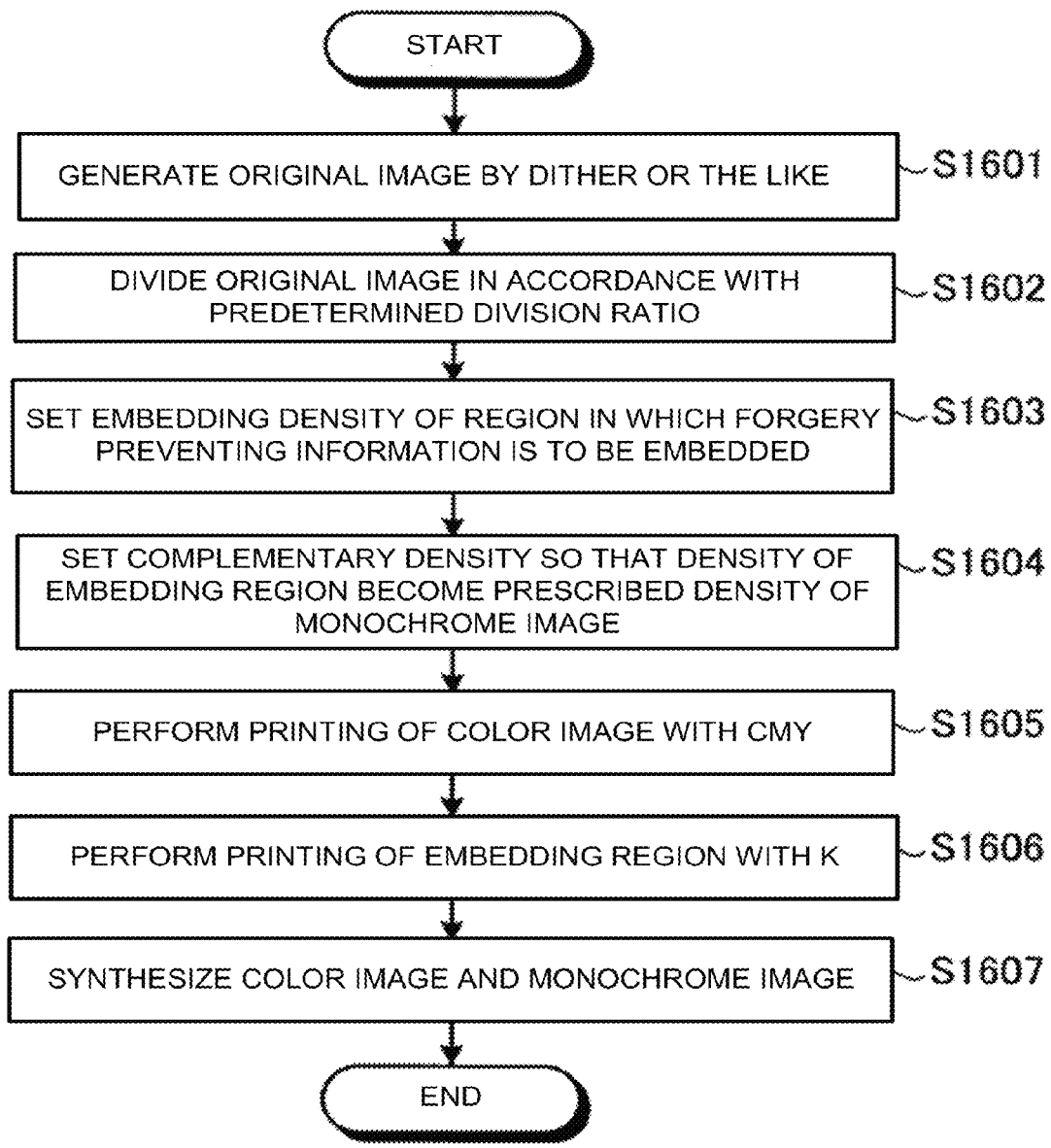
FIG. 16 is a flow chart showing an example of a flow of a print processing of an image by the ID card manufacturing device according to the fourth embodiment.

Next, using FIG. 16, a flow of a print processing of an image by the ID card manufacturing device 30 according to the present embodiment will be described. FIG. 16 is a flow chart showing an example of a flow of a print processing of an image by the ID card manufacturing device according to the fourth embodiment.

In the present embodiment, the image processing section 31 generates an original image using a dither method or the like (step S1601). Next, the image processing section 31 divides image data of the original image into monochrome image data and color image data, using a predetermined division ratio (step S1602). Next, the image processing section 31 determines a part of a background image of the face image 11 in the monochrome image FM based on the monochrome image data as the embedded region r.

Further, the image processing section 31 sets the embedding density d at the time of printing the embedded region r using a K ink, based on forgery preventing information to be embedded in the original image (step S1603). In addition, when the embedding density d is lower than the prescribed density of the monochrome image FM, the image processing section 31 sets a complementary density at the time of printing the embedded region r, using a black color in which the CMY inks are superposed so that the density of the embedded region r becomes equal to the prescribed density of the monochrome image FM (step S1604).

After that, the ink jet printing section 32 performs printing of the color image FC based on the color image data, using the CMY inks, on the substrate 2 (step S1605). Further, the ink jet printing section 32 performs printing of a region except the embedded region r in the monochrome image FM based on the monochrome image data, on the substrate 2, using the K ink.

Next, the ink jet printing section 32 prints the embedded region r in the monochrome image FM to be printed in the substrate 2, using the K ink, at the embedding density d (step S1606). Further, when the embedding density d is lower than the prescribed density of the monochrome image FM, the ink jet printing section 32 prints the embedded region r using a black color in which the CMY inks are superposed, at the complementary density. By this means, an original image in which the color image FC and the monochrome image FM are synthesized, is formed on the substrate 2 (step S1607).

In addition, when having printed the color image FC and the monochrome image FM on members (the substrate 2 or the film F) different from each other, the ID card manufacturing device 30 finally pastes the substrate 2 and the film F together, and thereby synthesizes the color image FC and the monochrome image FM.

In this manner, according to the ID card manufacturing device 30 according to the fourth embodiment, since it is possible to embed the forgery preventing information in the original image in a state invisible by the naked eye, when the forgery preventing information is embedded in personal information such as the face image 11 and the character information 12, it is possible to enhance resistance to the abuse of the ID card 1 without deteriorating the image quality of the personal information.

Fifth Embodiment

The present embodiment is an example to print an embedded region by laser engraving at an embedding density. In the following description, regarding the same portion as the portion in the second and fourth embodiments, the description thereof will be omitted.

In the present embodiment, the laser engraving section 93 of the ID card manufacturing device 90 prints the embedded region r of the monochrome image FM by laser engraving at the embedding density d. By this means, since it is possible to embed forgery preventing information in an original image in a state invisible by the naked eye, in the same manner as in the fourth embodiment, when the forgery preventing information is embedded in personal information such as the face image 11 and the character information 12, it is possible to enhance resistance to the abuse of the ID card 1 without deteriorating the image quality of the personal information.

In the present embodiment, the image processing section 91 performs the determination of the embedded region r and the setting of the embedding density d, in the same manner as the image processing section 31 of the fourth embodiment. And the laser engraving section 93 irradiates a region except the embedded region r in the monochrome image FM with laser from the laser irradiation section 93b, and thereby prints the region at the prescribed density of the monochrome image FM. In addition, the laser engraving section 93 irradiates the embedded region r with a laser from the laser irradiation section 93b, and thereby prints the embedded region r at the embedding density d.

In addition, in the present embodiment, the image processing section 91 performs the determination of the reference region rr, and the selection of the reference density, in the same manner as the image processing section 31 of the fourth embodiment. And, the laser engraving section 93 irradiates the reference region rr with a laser from the laser irradiation section 93b, and thereby prints the reference region rr at the reference density.

Further, in the present embodiment, when the embedding density d is lower than the prescribed density of the monochrome image FM, the ink jet printing section 92 prints the embedded region r in a black color in which the CMY inks are superposed, in the same manner as the ink jet printing section 32 of the fourth embodiment, so that the density of the embedded region r becomes equal to the prescribed density of the monochrome image FM.

Figure 17:
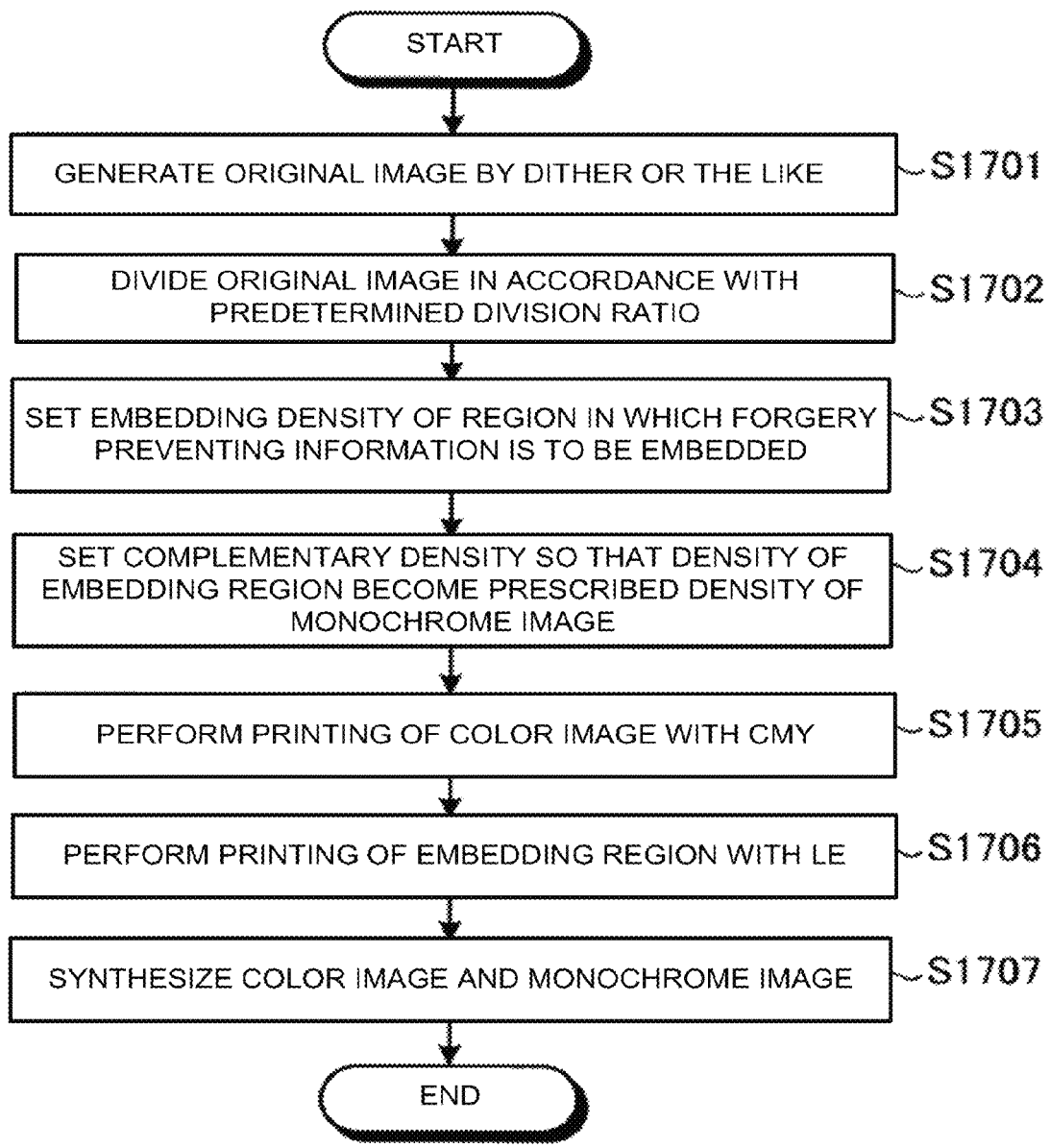
FIG. 17 is a flow chart showing an example of a flow of a print processing of an image by an ID card manufacturing device according to a fifth embodiment.

Next, a flow of a print processing of an image by the ID card manufacturing device 90 according to the present embodiment will be described, using FIG. 17. FIG. 17 is a flow chart showing an example of a flow of a print processing of an image by the ID card manufacturing device according to the fifth embodiment.

In the present embodiment, the image processing section 91 generates an original image using a dither method or the like (step S1701). Next, the image processing section 91 divides image data of the original image into monochrome image data and color image data, using a predetermined division ratio (step S1702). Next, the image processing section 91 determines a part of the background image of the face image 11, in the monochrome image FM based on the monochrome image data, as the embedded region r.

Further, the image processing section 91 sets the embedding density d at the time of printing the determined embedded region r by laser engraving, based on the forgery preventing information to be embedded in the original image (step S1703). In addition, when the embedding density d is lower than the prescribed density of the monochrome image FM, the image processing section 91 sets a complementary density at the time of printing the embedded region r, using a black color in which the CMY inks are superposed, so that the density of the embedded region r becomes equal to the prescribed density of the monochrome image FM (step S1704).

After that, the ink jet printing section 92 performs printing of the color image FC based on the color image data, using the CMY inks, on the substrate 2 (step S1705). Further, the ink jet printing section 92 performs printing, by laser engraving, of a region except the embedded region r in the monochrome image FM based on the monochrome image data, on the substrate 2.

Next, the laser engraving section 93, irradiates in the substrate 2 with laser, to print the embedded region r in the monochrome image FM, at the embedding density d (step S1706). Further, when the embedding density d is lower than the prescribed density of the monochrome image FM, the ink jet printing section 92 prints the embedded region r using a black color in which the CMY inks are superposed, at the complementary density. By this means, an original image in which the color image FC and the monochrome image FM are synthesized is formed on the substrate 2 (step S1707).

In addition, when having printed the color image FC and the monochrome image FM on members (the substrate 1 2 or the film F) different from each other, the ID card manufacturing device 90 finally pastes the substrate 2 and the film F together, and thereby synthesizes the color image FC and the monochrome image FM.

In this manner, according to the ID card manufacturing device 90 according to the fifth embodiment, it is possible to embed the forgery preventing information in the original image in a state invisible by the naked eye, in the same manner as the fourth embodiment. Accordingly, it is possible to enhance resistance to the abuse of the ID card 1 without deteriorating the image quality of the personal information when the forgery preventing information is embedded in personal information such as the face image 11 and the character information 12.

Sixth Embodiment

The present embodiment is an example of a detection device which acquires forgery preventing information from the ID card manufactured by one of the ID card manufacturing devices according to the fourth and fifth embodiments. In the following description, regarding the same configuration as the configuration in the third embodiment, the description thereof will be omitted.

In the present embodiment, the embedded region r in the original image printed on the ID card 1 is printed with a K component which absorbs a light of a wavelength of a near infrared ray band, or printed by laser graving. For the reason, a light with which the irradiation section 1201 irradiated the embedded region r is absorbed by the embedded region r, and thereby the reflectivity thereof becomes low, and the reflectivity thereof varies depending on a density (embedding density d) of the printing performed to the embedded region r with the K component or by laser engraving.

The signal processing section 1205 identifies a density of the embedded region r, based on the image signal transmitted from the sensor 1204, and acquires forgery preventing information corresponding to the identified density. For example, the signal processing section 1205 acquires a code associated with the identified density as the forgery preventing information, using the embedding density table T shown in FIG. 14.

Then, the image display section 1206 displays the forgery preventing information (for example, the code) acquired by the signal processing section 1205. By this means, a user of the detection device confirms the forgery preventing information displayed on the image display section 1206, and can thereby determine authenticity of the ID card 1. In addition, the determination section 1207 determines authenticity of the ID card 1 based on the forgery preventing information acquired by the signal processing section 1205.

In this manner, according to the detection device according to the sixth embodiment, a light of a wavelength of a near infrared ray band is detected, and thereby the forgery preventing information embedded in the monochrome image FM can be detected.

As described above, according to the first to third embodiments, since a forgery preventing character can be printed in the monochrome image FM of any density, it is possible to print the forgery preventing character in the monochrome image FM with a density which differs depending on a person. In addition, according to the fourth to sixth embodiments, when embedding forgery preventing information in personal information, it is possible to enhance resistance to the abuse of the ID card 1, without deteriorating the image quality of the personal information.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing method, comprising:
   detecting a density of a first black image to be printed in a first black color;
   determining, when the detected density is equal to a first density, a size of a first character to be embedded in the first black image to a first size, and printing the first character at the first size in a second black color with a transmissivity at a near infrared ray band that is different from that of the first black color;
   determining, when the detected density is lower than the first density, a size of the first character to a second size larger than the first size, and printing the first character at the second size in the second black color; and
   printing a region except a region in which the first character is to be printed in the first black image, in the first black color.

2. The printing method according to claim 1, wherein:
   the first black color is a color of a black (K) ink; and
   the second black color is a color in which respective inks of cyan (C), magenta (M) and yellow (Y) are superposed;
   further comprising:
   detecting a first ratio of a black image in a first image of a print target;
   dividing the first image of the print target into a second image to be printed with the CMY inks and the first black image to be printed with the K ink, at a prescribed ratio;
   printing the second image with the CMY inks; and
   printing the first image by synthesizing the second image and the first black image.

3. The printing method according to claim 2, wherein:
   when the first ratio is not more than a prescribed ratio, a ratio of the first black image in the division ratio is increased.

4. The printing method according to claim 2, wherein:
   the size of the first character is determined with reference to a table in which the density of the first black image and a size of a character to be embedded in the first image are associated with each other.

5. The printing method according to claim 1, wherein:
   in the first black image, the density varies depending on an area of dots per unit area.

6. The printing method according to claim 5, wherein:
   the size of the first character is determined so that a line width of the first character is longer than a distance between the dots.

7. The printing method according to claim 1, wherein:
   the first black color is a black color printed by laser engraving.

8. The printing method according to claim 1, wherein:
   to detect the density of the first black image to be printed in the first black color is to detect a density of a prescribed region in which a character is to be embedded in the first black image.

9. A printing method, comprising:
   printing a first region that is at least a part of a first black image, using a first black color with a transmissivity of a light at a near infrared band that is a first transmissivity, at a second density which is not more than a first density that is previously set to the first region and corresponds to forgery preventing information; and
   printing, when the second density is lower than the first density, the first region using a second black color with a transmissivity of a light at the near infrared band that is a second transmissivity different from the first transmissivity, so that a density of the first region becomes equal to the first density.

10. The printing method according to claim 9, wherein:
    the first region is a region of shape of a character code in the first black image.

11. The printing method according to claim 9, further comprising:
    printing a second region which is different from the first region in the first black image, using the first black color, at a density that is a reference of the first density.

12. The printing method according to claim 11, wherein:
    the second region has two regions in the first black image;
    further comprising:
    printing one region using the first black color, at an upper limit density of a density set for the first region; and
    printing another region using the first black color, at a lower limit density of the density set to the first region.

13. The printing method according to claim 12, wherein:
    a density of the first region of the first black image is the first density.

14. The printing method according to claim 9, wherein:
    in the first black image, the density varies depending on an area of dots per unit area.

15. The printing method according to claim 9, wherein:
    the first black color is a color of a black (K) ink; and
    the second black color is a color in which respective inks of cyan (C), magenta (M) and yellow (Y) are superposed;
    further comprising:
    detecting a first ratio of a black image in a first image of a print target;
    dividing the first image of the print target into a second image to be printed with the CMY inks and the first black image to be printed with the K ink, at a prescribed ratio;
    printing the second image with the CMY inks;
    printing a region except the first region in the first black image, with the K ink; and
    printing the first image by synthesizing the second image and the first black image.

* * * * *